United States Patent [19]
Noel et al.

[11] 3,933,034
[45] Jan. 20, 1976

[54] HYDROSTATIC STRESS GAUGE SYSTEM

[75] Inventors: James S. Noel, Waco, Tex.; John V. Hobbs, Camarillo, Calif.; Leonard D. Webb, College Station, Tex.

[73] Assignee: The United States of America as represented by the Secretary of the Air Force, Washington, D.C.

[22] Filed: Mar. 25, 1974

[21] Appl. No.: 454,198

[52] U.S. Cl............ 73/88.5 R; 73/141 A; 73/398 R
[51] Int. Cl.²........................................... G01L 1/02
[58] Field of Search ..... 73/88.5, 88 C, 88 E, 398 R, 73/141 A; 336/30

[56] References Cited
UNITED STATES PATENTS

| | | | |
|---|---|---|---|
| 2,548,947 | 4/1951 | Clewell | 73/88.5 R |
| 2,703,491 | 3/1955 | Goetz | 73/88.5 R |
| 3,517,550 | 6/1970 | Leventhal | 73/88.5 R |

Primary Examiner—Herbert Goldstein
Assistant Examiner—Anthony V. Ciarlante
Attorney, Agent, or Firm—Joseph E. Rusz; Henry S. Miller

[57] ABSTRACT

A hydrostatic stress gage including a sphere of incompressible fluid having positioned inside a drum like structure containing a pair of interconnected flat spiral coils forming a self-resonant tuned circuit, a change in pressure on the sphere will cause a variation in distance between the coils whereby changing the resonant frequency, when measured by an appropriate device stress may be measured.

4 Claims, 3 Drawing Figures

HYDROSTATIC STRESS GAUGE SYSTEM

BACKGROUND OF THE INVENTION

This invention relates generally to solid propellant motors and more specifically to a system for measuring the response of solid propellants to externally imposed loads and environments.

Advancements in the field of solid propellant motors have included a multitude of various compositions designed to improve the efficiency and reliability as well as the storage and handling characteristics. The basic criteria for these alternative forms of solid propellant motors lies in the chemical makeup of the material rather than the physical properties expected. While the chemical aspects of composite propellants may be predicted with a reasonable degree of accuracy based on known data and experience, physical properties are more difficult to ascertain.

One of the principal drawbacks in accurately calculating the stresses, strains and deflections of solid propellant motor grains to externally imposed loads is the fact that the newness of composite propellants has not allowed the mechanical behavior of these grains to be fully understood. Hence, it is essential that these quantities be measured. Additional difficulties arise in the measurement of the quantities in that conventional transducers and the associated lead wires utilized to sense these mechanical states cause disturbances to the stress/strain field that is sought to be definined.

Therefore, a new and improved hydrostatic stress gage system has been invented which will overcome the disadvantages of the prior art devices and provide reliable, accurate means for measuring these parameters within a solid propellant motor

SUMMARY OF THE INVENTION

The invention consists of a pressure sensor system which can be monitored remotely, submerged within a container of initially pressurized fluid. The container is embedded within the propellant grain. Changes in the fluid pressure reflect the hydrostatic stresses acting between the container and the propellant. If volumetric properties of the container (co-efficient of thermal expansion and bulk modulus of elasticity) match those of the surrounding propellant, the indicated stress will remain unchanged by the gage-propellant interaction. Further, fluid pressure, and sensing will be unchanged by the distortioned or deviatoric stresses.

The pressure sensor is formed by mounting a coil pair to the diaphrams within a drum-type structure contained in a liquid filled sphere. Pressure forces will distend the diaphrams inward, reducing the nominal spacing between the coils. Changes in the face-to-face distance between the coils is sensed as a change in the resonant frequency of the combination.

The resonant frequency is sensed remotely by means of a modified "grid-dip meter" which emits energy and monitors the intensity of the return signal.

It is therefore an object of the invention to provide a new and improved hydrostatic stress gage system.

It is another object of the invention to provide a new and improved hydrostatic stress gage for use in solid propellant rocket engines.

It is a further object of the invention to provide a new and improved hydrostatic stress gage that operates without external connections.

It is still another object of the invention to provide a new and improved hydrostatic stress gage that utilizes a resonant frequency to remotely measure stress.

It is still a further object of the invention to provide a new and improved method for measuring stress in solid propellant rocket engines.

It is another object of the invention to provide a stress gage which is economical to produce and utilizes conventional, currently available components that lend themselves to standard mass production manufacturing techniques.

These and other advantages, features and objects of the invention will become more apparent from the following description taken in connection with the illustrative embodiment in the accompanying drawing.

DESCRIPTION OF THE PREFERRED EMBODIMENT

Figure 1:
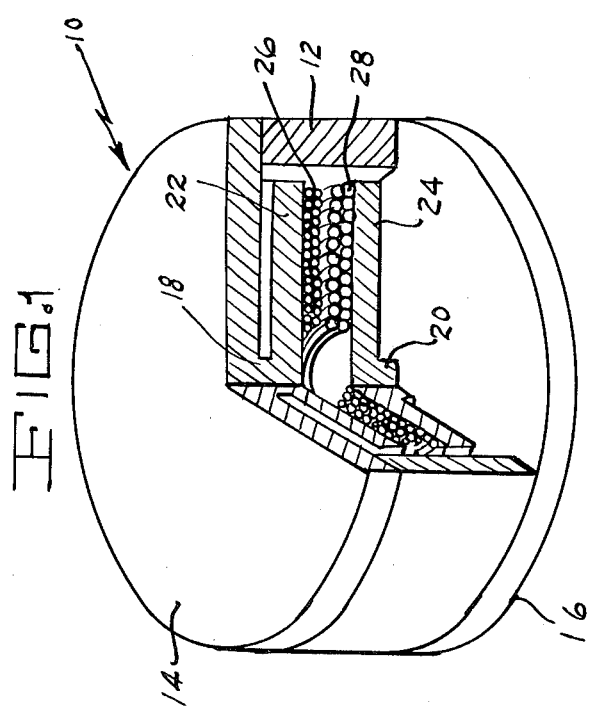
FIG. 1 is a perspective view of the invention partially cut away.

Referring now to FIG. 1 there is shown the hydrostatic stress gage generally at 10. A housing 12 is formed of a cylinder having two end caps 14, 16. Attached to each end cap and internally of the cylinder is a post 18,20. Affixed to the post is a flat disc-shaped member referred to as a coil support 22,24. The end cap, post and coil support may be separate pieces and affixed in a permanent manner or alternatively they may be cast or machined from a single piece.

In practice it has been found that the best results are obtained from fused quartz or glass however the scope of the invention is not so limited to these materials.

Mounted on each coil support is a flat pancake shaped spiral coil 26, 28. The coils are connected as a single coil. (series aiding) with face-to-face positioning. Changes in this face-to-face distance are sensed as a change in the resonant frequency of the coil pair.

Figure 2:
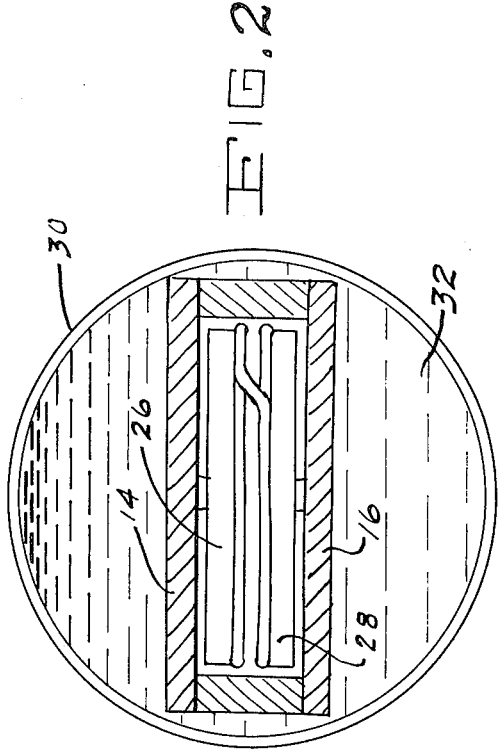
FIG. 2 is a side elevational view of the invention with the body in crossection.

Concerning FIG. 2, the housing is positioned inside a plastic sphere 30. The sphere is filled with an incompressible fluid 32, such as distilled water, silicone fluid, or any other noncorrosive, highly incompressible, nonconductive liquid. In the invention, the end caps 14 and 16 act as diaphragms causing the distance between the coils 26 and 28 to vary in accordance with the pressure on the sphere 30. The variation in distance causes the resonance of the coils to vary when exposed to a self resonant piped circuit when exposed to a field.

Figure 3:
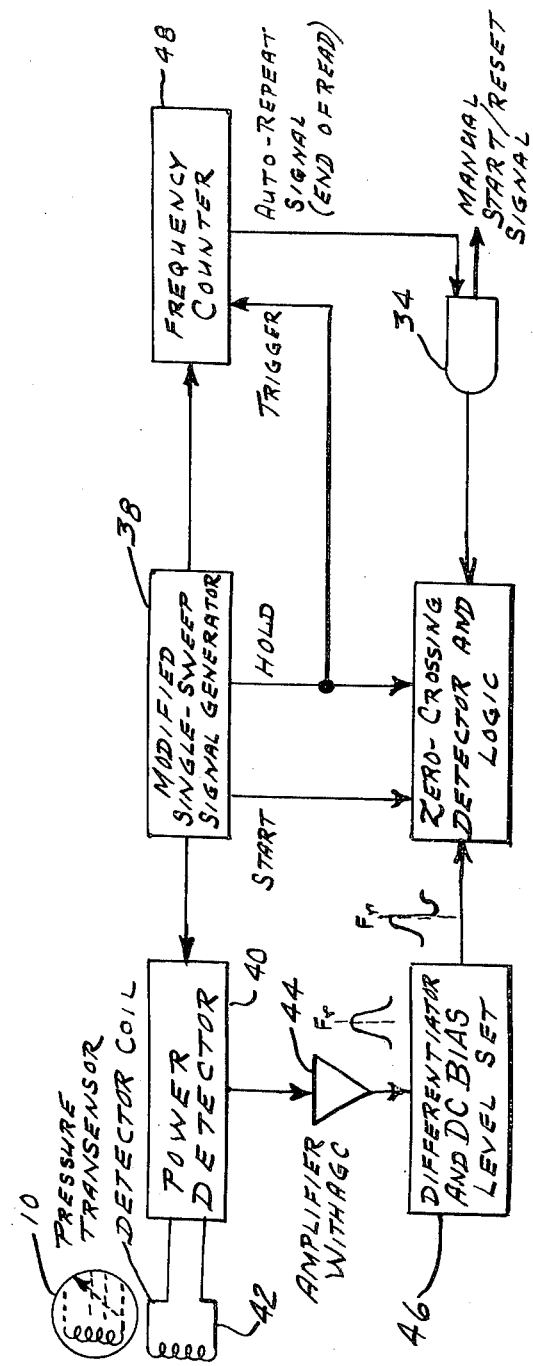
FIG. 3 is a block diagram of the readout system of the invention.

FIG. 3 illustrates the operation of the invention system. The hydrostatic stress gage is shown at 10. A variation in the tuned circuit is measured with a modified grid-dip meter. The improvement in system includes modification of the sweep signal-generator 38 which is changed to allow a sweep to be interrupted and remain at the frequency at which the interruption has occurred and is referred to as the interrupt/hold mode. The modification is accomplished by the insertion of a track-and-hold module between the sweep and oscillator sections in the sweep generator. The modification is understood by those in the field.

In operation, the sweep cycle is initialed by a manual signal or end-of-reading signal 34 from the frequency counter 48. The signal generator 38 begins a sweep of frequency band in which the stress gage resonance will occur. Maximum absorption of power will occur when the signal generator is at the resonance frequency. The power detector 40 output signal (radiated at 42) will be maximum at this time. Further amplification using amplifier 44 will increase the signals.

The differentiator 46 will turn the absorption signal into one in which maximum negative slope occurs at the resonance point. When the dc bias level is set at the appropriate point of this curve, the negative slope zero crossing is independent of signal level. The zero-crossing detector 36 will sense this point and trigger a set-reset circuit to stop-and-hold the signal generator sweep. At this time the frequency counter 48 will be triggered to read. The cycle can be repeated at each end-of-reading period. The resulting frequency will be a function of pressure on the hydrostatic stress gage.

Having thus described our invention of a hydrostatic stress gage system we claim the following as our invention:

1. A hydrostatic stress gage comprising: a sphere of deformable material; a cylinder positioned within the sphere deformable cover means located at each end of said cylinder for forming an enclosure; support means attached to each of said cover means extending into the enclosure; flat conductive coil means mounted on each support means, and an incompressible fluid filling the volume between the sphere and enclosure whereby the distance between said coils varies upon deformation of said sphere.

2. A hydrostatic stress gage according to claim 1 wherein said cover means is quartz.

3. A hydrostatic stress gage according to claim 1 wherein, said coils are spiral wound, serially connected and parallel mounted.

4. A hydrostatic stress gage according to claim 1 including, system for generating a resonant frequency connected to the conductive coils; means for detecting a change in frequency, and means for recording a change in frequency connected through the detecting means to the generating system.

* * * * *